US009383938B2

(12) United States Patent
Greco et al.

(10) Patent No.: US 9,383,938 B2
(45) Date of Patent: Jul. 5, 2016

(54) METHOD, SYSTEM, AND APPARATUS FOR RE-CONVEYING INPUT/OUTPUT OPERATIONS UTILIZING A SEQUENTIAL-ACCESS DATA STORAGE DEVICE SECONDARY COMMUNICATION PORT

(75) Inventors: Paul M. Greco, Tucson, AZ (US); Glen A. Jaquette, Tucson, AZ (US); James M. Karp, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1059 days.

(21) Appl. No.: 11/405,796

(22) Filed: Apr. 18, 2006

(65) Prior Publication Data
US 2008/0005412 A1   Jan. 3, 2008

(51) Int. Cl.
G06F 3/06 (2006.01)
G06F 11/14 (2006.01)

(52) U.S. Cl.
CPC .............. *G06F 3/0647* (2013.01); *G06F 3/061* (2013.01); *G06F 3/065* (2013.01); *G06F 3/067* (2013.01); *G06F 11/1451* (2013.01); *G06F 3/0634* (2013.01)

(58) Field of Classification Search
USPC ........................................................ 711/111
See application file for complete search history.

(56) References Cited

U.S. PATENT DOCUMENTS

| | | | |
|---|---|---|---|
| 6,549,992 B1 | 4/2003 | Armangau | |
| 6,647,474 B2 * | 11/2003 | Yanai et al. | 711/162 |
| 6,718,352 B1 * | 4/2004 | Dang et al. | 707/205 |
| 6,728,848 B2 | 4/2004 | Tamura | |
| 7,111,189 B1 * | 9/2006 | Sicola et al. | 714/6 |
| 7,395,388 B2 * | 7/2008 | Sugiura et al. | 711/162 |
| 2001/0047412 A1 * | 11/2001 | Weinman, Jr. | 709/225 |
| 2003/0046602 A1 * | 3/2003 | Hino | G06F 11/2033 714/4.4 |
| 2004/0030721 A1 * | 2/2004 | Kruger et al. | 707/104.1 |
| 2004/0044865 A1 * | 3/2004 | Sicola et al. | 711/162 |
| 2004/0073831 A1 * | 4/2004 | Yanai et al. | 714/7 |
| 2004/0226021 A1 * | 11/2004 | Miki | G06F 3/0619 719/313 |

(Continued)

FOREIGN PATENT DOCUMENTS

| | | |
|---|---|---|
| EP | 1 617 320 A2 | 1/2006 |
| JP | 7141798 A | 6/1995 |

(Continued)

OTHER PUBLICATIONS

DataCore Software, "Data Mirroring Alternatives for Network Storage Pools", 2001, pp. 1-11.*

*Primary Examiner* — Charles Rones
*Assistant Examiner* — Ralph A Verderamo, III
(74) *Attorney, Agent, or Firm* — Griffiths & Seaton PLLC

(57) ABSTRACT

A method, system, and apparatus for re-conveying input/output (I/O) operations utilizing a sequential-access data storage device secondary communication port are disclosed. In accordance with one embodiment, a method is provided which comprises receiving an input/output (I/O) operation request via a first communication port of a primary data storage device, processing the I/O operation request utilizing the primary data storage device, and re-conveying the I/O operation request to a secondary data storage device substantially simultaneously with the processing via a second communication port of the primary data storage device. In the described embodiment, the primary data storage device comprises a sequential-access data storage device.

16 Claims, 5 Drawing Sheets

(56) References Cited

U.S. PATENT DOCUMENTS

| | | | |
|---|---|---|---|
| 2005/0033828 A1* | 2/2005 | Watanabe | G06F 11/2074 709/219 |
| 2005/0071549 A1* | 3/2005 | Tross et al. | 711/113 |
| 2005/0108470 A1 | 5/2005 | Gold | |
| 2005/0120174 A1* | 6/2005 | Uratani | G06F 3/0607 711/114 |
| 2006/0085609 A1* | 4/2006 | Ninose et al. | 711/162 |
| 2007/0180211 A1* | 8/2007 | Takaoka et al. | 711/170 |

FOREIGN PATENT DOCUMENTS

| | | |
|---|---|---|
| JP | 7249263 A | 9/1995 |
| JP | 2002007304 A | 1/2002 |
| JP | 2003162379 A | 6/2003 |
| JP | 2004030254 A | 1/2004 |
| JP | 2004118406 A | 4/2004 |
| JP | 2005018509 A | 1/2005 |
| JP | 2005092424 A | 4/2005 |
| JP | 2006011581 A | 1/2006 |
| JP | 2006059260 A | 3/2006 |

\* cited by examiner

METHOD, SYSTEM, AND APPARATUS FOR RE-CONVEYING INPUT/OUTPUT OPERATIONS UTILIZING A SEQUENTIAL-ACCESS DATA STORAGE DEVICE SECONDARY COMMUNICATION PORT

BACKGROUND

1. Technical Field

Embodiments of the present invention relate generally to data storage and management and more particularly to a method, system, and apparatus for re-conveying input/output (I/O) operations utilizing a sequential-access data storage device secondary communication port.

2. Description of the Related Art

As the use of data processing systems has become more prevalent, the techniques used to store and manage data produced by such data processing systems have evolved. One mechanism for storing, providing access to, and processing such data is the data storage subsystem. A data storage subsystem includes an integrated collection of data storage controllers and/or host bus adapters, data storage devices, and any required control software used to provide data storage services to one or more data processing systems. Data storage subsystems can be simple or complex, large or small (in terms of physical structure and/or data storage capacity), ranging from a single data storage device, to an intelligent storage array, to a storage area network or storage domain thereof. Conventional data storage devices include machine-readable media (e.g., fixed disks, CD/DVD-ROMs, tapes, solid state memory, or the like) which may be fixed, removable, magnetic, optical, random/direct access, and/or sequential access as well as media loaders and robots utilized to access such media.

In a sequential-access data storage device (e.g., a tape data storage drive) data is organized and I/O operations are performed in a sequential fashion. In other words, individual I/O operations (e.g., read and write operations) are performed such that data is written sequentially in the order it is received and read sequentially in the order it is stored within associated sequential-access data storage media and device access occurs such that I/O operations are performed serially. In many sequential-access data storage devices, data access is provided via a single half-duplex communication port such as a small computer system interface (SCSI) or Fibre Channel (FC) port. Although sequential-access data storage devices have more recently been provided having additional communication ports, these additional ports have thus far been utilized strictly for failover/redundancy or to otherwise provide sequential and serial data access.

As data storage subsystems have developed, more and more functionality that was originally managed or performed by host data processing systems (e.g., servers) has been off-loaded to data storage devices and storage subsystem infrastructure. One example of this functionality shift is the use of "serverless" or "server-free" backups.

In serverless backup, an existing procedure or protocol such as the Third Party Copy Protocol provided by the Storage Network Industry Association (SNIA) or the Extended Copy (X Copy) Command as described in Information Technology—SCSI Primary Commands—4 (SPC-4), Working Draft, Revision 02, T10, a Technical Committee of the Accredited Standards Committee of the National Committee for Information Technology Standards (NCITS), Sep. 15, 2005 is utilized to copy or "backup" data from a first data storage device to a second data storage device without using a server data processing system for data transfer. Typically, serverless backup is performed using a SAN redistribution node (e.g., a FC switch) or an intelligent storage device (e.g., a disk storage array, tape data storage drive, tape library, or the like).

As a consequence of their data storage structure and access mechanism, the rate at which data stored within conventional sequential-access data storage devices may be accessed via "read" or "write" type input/output (I/O) operations, and consequently the rate at which more complex data storage and management operations such as serverless backup may be performed, are relatively slow as compared to other data storage device types (e.g., fixed disk, direct access storage devices).

SUMMARY

A method, system, and apparatus for re-conveying input/output (I/O) operations utilizing a sequential-access data storage device secondary communication port are provided herein. In accordance with one embodiment of the present invention, a method is provided which comprises receiving an input/output (I/O) operation request via a first communication port of a primary data storage device, processing the I/O operation request utilizing the primary data storage device, and re-conveying the I/O operation request to a secondary data storage device substantially simultaneously with the processing via a second communication port of the primary data storage device. In the described embodiment, the primary data storage device comprises a sequential-access data storage device.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, software, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same or similar reference symbols within the accompanying drawings is intended to indicate similar or identical items.

DETAILED DESCRIPTION OF AN ILLUSTRATIVE EMBODIMENT

Figure 1:
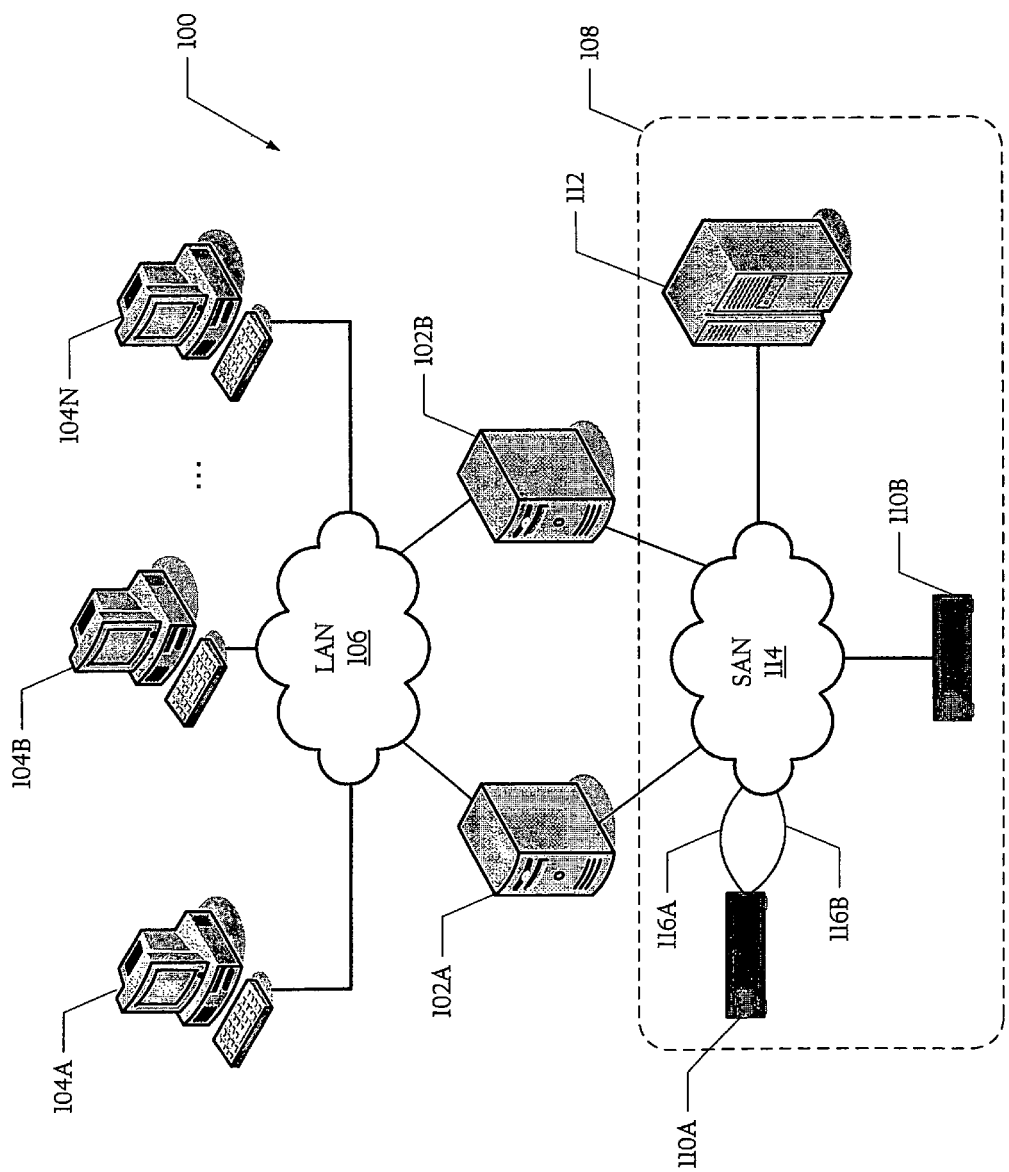
FIG. 1 illustrates a high-level block-diagram representation of an enterprise including a sequential-access data storage device according to an embodiment of the present invention.

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide a method, system, and apparatus for re-conveying or replicating input/output (I/O) operations utilizing a secondary communication port of a sequential-access data storage device. As specified in the SCSI and Fibre Channel Protocol for SCSI (FCP) architectures, a communications port (e.g., a FC or SCSI port) may assume the role of either a target or an initiator in data transfer operations. For example, when a serverless backup procedure is performed, a SCSI X Copy command is transmitted from a primary initiator port (e.g., of a server data processing system) to a primary target port (e.g., of a tape data storage drive) which sets up and enables a transfer data sequence between the primary target port and a secondary target port (e.g., of a disk storage array). Once enabled, the primary target port acts as a temporary initiator to send commands to the secondary target port and manage the X Copy operation and associated data transfer. Once complete, the primary target port resumes the role of target and returns status data to the primary initiator port. Embodiments of the present invention utilize an architecture similar to that described with respect to the X Copy operation to extend data storage and management (e.g., requests to perform I/O operations) through one or more secondary communication port(s) of a data storage device at substantially the same time I/O operations are being received and processed by the data storage device, thereby enabling advanced operations and/or improved performance.

Embodiments of the present invention provide an environment in which, as requests to perform I/O operations are received from a primary initiator port at a primary target port of a data storage device, a secondary communication port (or ports) of the data storage device is utilized as an initiator to re-convey the I/O operation requests to/from another communicatively-coupled device (e.g., on a SAN). The other (secondary target) device to which I/O operation requests are re-conveyed may comprise a sequential-access or direct-access data storage device (e.g., a tape data storage device, a disk data storage device, or the like).

FIG. 1 illustrates a high-level block-diagram representation of an enterprise including a sequential-access data storage device according to an embodiment of the present invention. Enterprise 100 of FIG. 1 comprises a number of host data processing systems (e.g., server data processing systems 102 and associated client data processing systems 104) which are communicatively coupled together via a first network interconnect (e.g., local area network or "LAN" interconnect 106) as shown. Server data processing systems 102 of the depicted embodiment are further coupled to a storage subsystem 108 including a number of data storage devices and a second network interconnect (e.g., storage area network or "SAN" interconnect 114).

In the exemplary embodiment of FIG. 1, storage subsystem 108 comprises a first sequential-access data storage device (tape data storage device 110A), a second sequential-access data storage device (tape data storage device 110B), and a direct-access data storage device (disk storage array 112) communicatively coupled together and to server data processing systems 102 via a storage interconnect (SAN interconnect 114) such as an FC switch, switch fabric, arbitrated loop, or the like. Server data processing system 102A of the embodiment of FIG. 1 comprises an application server (e.g., a database server) to provide core operational functionality to one or more of client data processing systems 104A-104N (where "N" is a positive integer) and server data processing system 102B comprises another server (e.g., a cluster failover server, load-balancing server, backup server, or the like).

Tape data storage device 110A of the depicted embodiment is coupled to SAN interconnect 114 via a first communication link 116A and a second communication link 116B as shown. Each communication link may comprise any of a number of communication media capable of transmitting one or more electrical, optical, and/or acoustical propagated signals (e.g., copper wiring, fiber optic cable, or the like) between SAN interconnect 114 and a communication port of tape data storage device 110A.

In the illustrated embodiment, an I/O operation received at a first communication port (e.g., a physical interface or abstraction thereof such as a FC or SCSI port) of tape data storage device 110A via first communication link 116A is processed by tape data storage device 110A and substantially simultaneously re-conveyed to another storage device (e.g., tape data storage device 110B and/or disk storage array 112) or host data processing system (e.g., server data processing system 102A) via second communication link 116B as will be described herein in greater detail.

While a conventional SAN-type interconnect (SAN interconnect 114) has been specifically depicted in the embodiment of FIG. 1, in alternative embodiments of the present invention other interconnects (e.g., direct connection, local, metropolitan, and/or wide-area networks) and other protocols (e.g., FICON, ESCON, SSA, or the like) may be utilized. Moreover, while a particular number and arrangement of elements have been illustrated with respect to enterprise 100 of FIG. 1, it should be appreciated that embodiments of the present invention are not limited to enterprises, systems, or data storage devices having any particular number, type, or arrangement of components other than as explicitly recited herein and so may encompass a wide variety of system types, architectures, and form factors.

Figure 2:
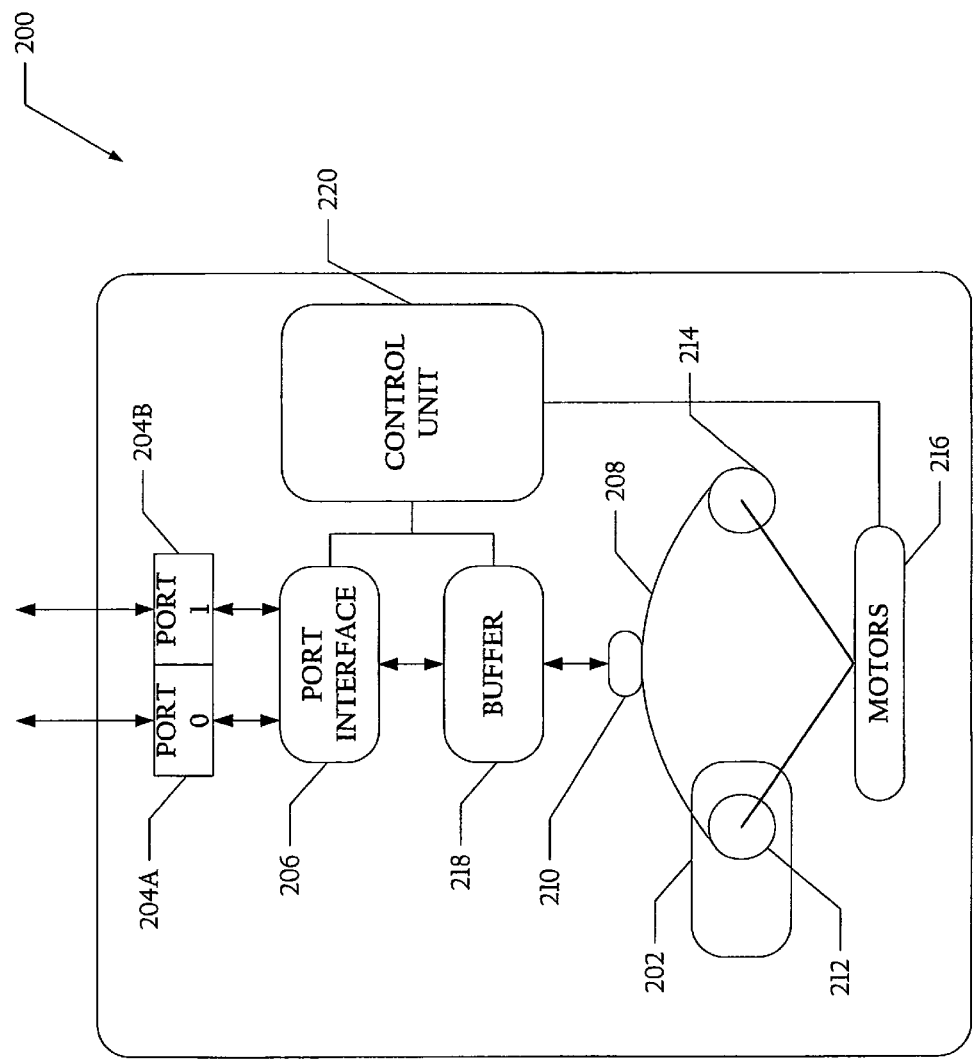
FIG. 2 illustrates a block-diagram representation of a sequential-access data storage device according to an embodiment of the present invention.

FIG. 2 illustrates a block-diagram representation of a sequential-access data storage device, more specifically a tape data storage device 200, according to an embodiment of the present invention. In the depicted embodiment, tape data storage device 200 comprises a removable data storage tape cartridge 202 and a communication channel interface (e.g., communication port interface 206) to communicatively couple tape data storage device 200 to one or more host data processing systems or associated communication channels (e.g., SAN interconnect 114) via one or more of included communication ports 204A and 204B.

In the embodiment of FIG. 2, communication port interface 206 is configured to receive an input/output (I/O) operation request (e.g., a "read" or "write" request) via communication port 204A, and to substantially simultaneously process the received I/O operation request and re-convey the I/O operation request to another data storage device via communication port 204B.

Data storage tape cartridge 202 of the illustrated embodiment comprises tape data storage media 208 (e.g., magnetic tape) routed in proximity to a tape access (e.g., read/write) head 210 utilizing media transport reels 212 and 214 and one or more media transport motors 216 as shown. In the illustrated embodiment, tape access head 210 is configured to read data from and write data to tape data storage media 208 and to temporarily store or "stage" such data within a buffer 218 (e.g., one or more "read-ahead" or staging buffers).

In the embodiment of FIG. 2, tape data storage device 200 further comprises a controller or control unit 220. Control unit 220 controls and manages data flow, formatting, and data storage subsystem operation via control signals issued to one or more of communication port interface 206, buffer 218, and/or media transport motors 216 in order to cause one or more method or process embodiments of the present invention or operations thereof to be performed. In another embodiment, such control functionality may be incorporated into one or more of communication port interface 206, control unit 220, and communication ports 204.

In one embodiment of the present invention, I/O operations (e.g., write operations) are re-conveyed from a primary target sequential-access data storage device to a secondary target sequential-access data storage device utilizing a secondary communication port of the primary target sequential-access data storage device. In the described embodiment, the secondary target sequential-access data storage device may be physically remote from the primary target sequential-access data storage device, so long as both target sequential-access data storage devices are communicatively coupled to a network interconnect (e.g., SAN interconnect 114 of FIG. 1).

Figure 3:
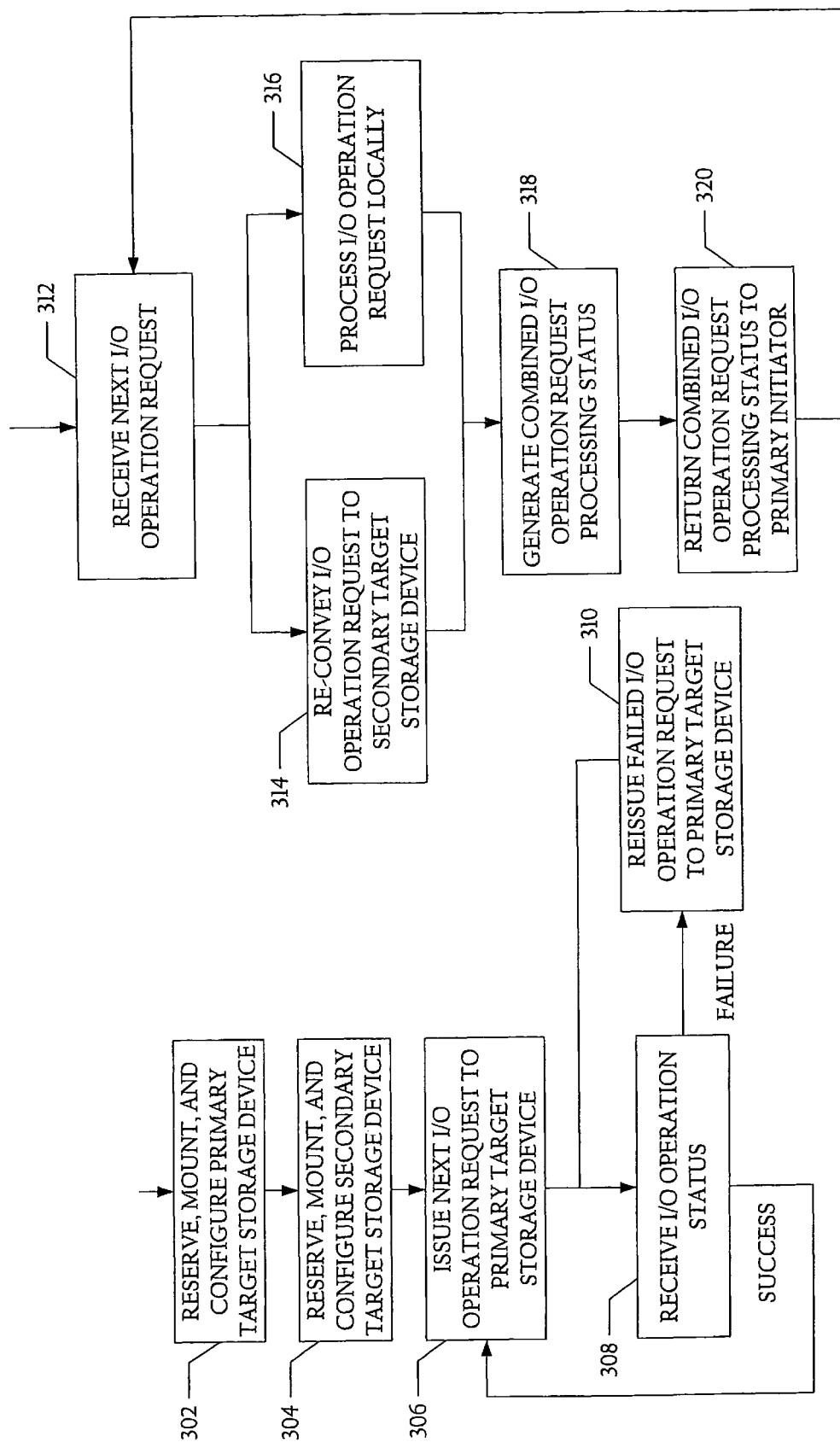
FIG. 3 illustrates a flow diagram of process to perform host-controlled I/O operation replication according to an embodiment of the present invention.

Utilizing such a method, a secondary (duplex) copy of data being written to the primary target sequential-access data storage device is simultaneously generated at the secondary target sequential-access data storage device. Such replication of I/O operations may be performed in either a host data processing system controlled or host data processing system transparent manner. FIG. 3 (including FIGS. 3A and 3B) illustrates a flow diagram of process to perform host-controlled I/O operation replication according to an embodiment of the present invention.

In the embodiment of FIG. 3A, a flow diagram of a host data processing system operational process for performing host-controlled I/O replication according to an embodiment of the present invention is illustrated. In the illustrated process embodiment, a primary target sequential-access data storage device is reserved, mounted, and configured (e.g., by a host data processing system primary initiator) (process block 302).

In conventional storage subsystems, each primary target data storage device defaults such that all communication ports present access to a common logical unit (i.e., a single target). In the embodiment of FIG. 3A by contrast, a configuration mechanism is provided to independently reserve a secondary communication port and enable it for third party operations as described herein. In one embodiment, such a configuration mechanism is implemented utilizing software via an extension of a SCSI "Reserve" command in order to reserve one or more communication ports separately from their associated devices (e.g., LUNs). In other embodiments, such configuration may be accomplished utilizing software to manipulate device vital product data (VPD) or via the direct or automated manipulation of device operator panel controls.

Device configuration may be performed statically or dynamically in various embodiments of the present invention. Where dynamic configuration is implemented, a port which is initially configured to re-convey received I/O operation requests may be subsequently re-configured to perform conventional (e.g., failover) functionality. As part of the described reservation, mounting, and configuration, automatic "mirroring" or re-conveyance of I/O operations directed at the primary target storage device is enabled. In one or more embodiments of the present invention such functionality is provided via a mechanism (e.g., a Mode Select parameter) activated alternatively for an entire mount or at a lower level of granularity (e.g., embedded as a parameter in each I/O operation command) allowing selective I/O operation replication such that only some I/O operation write data is mirrored to a secondary target.

Thereafter in the illustrated process embodiment, a secondary target sequential-access data storage device is reserved, mounted, and configured (e.g., by a host data processing system primary initiator) (process block 304). While the reservation, mounting, and configuration of the primary and secondary target sequential-access data storage devices are depicted as occurring serially in FIG. 3A, in alternative embodiments of the present invention such operations may be performed in parallel and/or in an interleaved fashion.

Once the target sequential-access data storage devices have been properly configured, requests to perform I/O operations (e.g., write operations) are issued to the primary target sequential-access data storage device (process block 306). As each I/O operation request (e.g., write operation command and associated data) is received, it is re-conveyed via a secondary communication port (e.g., a physical fiber port) to the secondary target data storage device. Such re-conveyance or retransmission of I/O operations may be performed utilizing any of a number of techniques in various embodiments. In one such embodiment, each received datagram (e.g., Fibre Channel frame) is temporarily buffered and modified to re-target the secondary sequential-access data storage device. In another embodiment, relevant, I/O operation-specific payload data is extracted from each received datagram (e.g., utilizing Fibre Channel interface hardware) and subsequently encapsulated within a newly-generated datagram having, for example, distinct transmit and receive identifiers and associated control information/metadata.

Thereafter, I/O operation status data specifying a result of the requested I/O operation is received (process block 308). If the requested I/O operation status data indicates the requested I/O operation has failed, the failed I/O operation is reissued to the primary target sequential-access data storage device (process block 310) until the requested I/O operation is successfully performed. Once the requested I/O operation is performed successfully, subsequent I/O operations may be issued as shown.

In one or more embodiments of the present invention, the described I/O operation status data may indicate "combined" completion status and/or completion status of the I/O operation to be performed on the primary target sequential-access data storage device alone. Where combined completion status is provided, the described status data is indicative of the completion status of both the I/O operation to the primary target sequential-access data storage device and a re-conveyed/duplicate I/O operation to the secondary target sequential-access data storage device. In such an embodiment, the primary target sequential-access data storage device issues such status data (e.g., to a host data processing system primary initiator) indicating successful completion of the I/O operation only once it has successfully completed the I/O operation locally and received status data indicating success from the secondary target sequential-access data storage device as well.

Where the completion status of the primary target sequential-access data storage device alone is indicated, the primary target sequential-access data storage device manages I/O operation status to the secondary target sequential-access data storage device asynchronously using its own data buffer to re-drive/issue I/O operation commands as necessary and to generate error recovery sequences. In such an embodiment, complete I/O operation status is synchronized or coalesced at the end of a sequence of I/O operation requests (e.g., when a rewind command is issued after a series of write commands). While re-issuance of I/O operations is depicted in the embodiment of FIG. 3A, in other embodiments of the present invention, such operations may not be performed. When a complete I/O operation command sequence is complete, all reservations or controls associated with the secondary target and held utilizing the primary target data storage device's secondary port are released. The primary target sequential-access data storage device then ceases to act as an initiator, resuming a "target" operational mode or state.

In the embodiment of FIG. 3B, a flow diagram of a primary target sequential-access data storage device operational process for performing host-controlled I/O operation replication according to an embodiment of the present invention is illustrated. According to the illustrated process embodiment, an I/O operation request/command is initially received (process block 312) via a first (e.g., primary) communication port. Thereafter, the received I/O operation request is processed (process block 316) by the primary target sequential-access data storage device as a duplicate of the I/O operation request is substantially simultaneously re-conveyed to a secondary target sequential-access data storage device (process block 314) via a second (e.g., secondary) communications port.

Once the received I/O operation request has been processed and re-conveyed as shown, combined I/O operation request processing status data is generated (process block 318). As previously described, while the use of combined status data is depicted in the embodiment of FIG. 3B, in alternative embodiments of the present invention such status data may be reflective of the processing status at the primary storage device alone. However generated, I/O operation request processing status data is then returned to the primary initiator (process block 320) before the next I/O operation is received for processing.

In an alternative embodiment of the present invention, I/O operation replication may be performed in a host-transparent, rather than host-controlled manner.

In a host "transparent" mode of operation, a primary target sequential-access data storage device is configured, (e.g., thru VPD or library interface means) prior to receiving I/O operation requests, in a mode where it is capable of managing its own secondary communication port and holding an implicit reservation of a secondary communication port of a secondary target data storage device. In the described embodiment, the secondary target is similarly configured. Such configuration of both primary and secondary target storage devices is accomplished in one embodiment via dynamic configuration.

A mount operation of the secondary target storage device is performed utilizing a pre-defined scratch pool of available volumes previously allocated for the purpose of performing "duplex" I/O operation by which I/O operation requests are re-conveyed as described herein. If a secondary "duplex-mate" volume exists for the primary volume mounted in the primary target data storage device, the existing secondary duplex cartridge is mounted to the secondary target volume. The primary target data storage device is not presented as "ready" to receive or process I/O operation requests until the secondary target storage device is also ready. I/O operation requests are then issued to the primary target data storage device in a conventional simplex manner. The primary target data storage device in turn manages performance of the duplex I/O operations at the secondary target in a manner transparent to original source initiator of the I/O including the management of retries, errors, and merging of status.

When a complete I/O operation (e.g., write) command sequence is complete, and, for example, a rewind/unload sequence command is issued, the primary target data storage system re-conveys or "mirrors" these same commands to the secondary target storage device to close out I/O operations thereon (e.g., to stop the drive and unload the tape). Final I/O operation status is then generated by the merger of status data from the two devices.

In another embodiment of the present invention, re-conveyance of I/O operation requests is utilized to provide a sequential-access storage device access to a shared direct-access storage array buffer, thus augmenting the sequential-access storage device's own internal buffer, if any. In the described embodiment, a primary target sequential-access data storage device is configured to use its secondary communication port to operate in an "Advanced Buffer" mode and a secondary target direct-access data storage device (e.g., a mirrored shared disk array) is utilized as a non-volatile shared buffer.

In the described embodiment, the secondary target storage device disk array buffer may reside anywhere communicatively coupled to and accessible by the primary target storage device (e.g., anywhere within a network segment to which the primary target data storage device is communicatively coupled). For error recovery purposes, other storage devices attached to the same host data processing system access the shared disk buffer in a similar manner and share a common tagged file system which identifies certain metadata (e.g., host data processing system ID, volume ownership, or the like) associated with data on the shared buffer. In this manner, error recovery is enabled in the event previously-buffered data is to be recovered and the initiating (e.g., writing) drive fails. In this case, the initiating host data processing system may connect and recover data from the shared buffer through an alternate drive path.

In one embodiment of the present invention, a primary target sequential-access data storage device (e.g., tape drive) manages a secondary target direct-access data storage device (e.g., disk drive or array) in such a manner that the additional virtual buffer provided by the secondary target direct-access data storage device and all associated operations (e.g., file management, protocol management, error recovery management, or the like) are transparent to an initiating host. In another embodiment, the secondary target direct-access data storage device reverts to normal operation and ceases to provide such buffer functionality if a communication link/connection between the primary and secondary data storage devices fails, or certain error conditions are detected in the secondary target direct-access data storage device's operation.

As described previously herein, configuration of devices such as the described primary and secondary target data storage devices may be accomplished through VPD/Op panel/user input means, library interface means, or host means. In one embodiment of the present invention, each primary target sequential-access data storage device enabled and configured to connect to a shared buffer is also capable of accessing a common status area utilized to manage the allocation of buffer areas to a direct-access storage device "drive" pool and/or to store metadata specifying file structures associated with data stored within a shared secondary target data storage device buffer. While buffer allocations within the secondary target direct-access data storage device are described as existing statically herein, in other embodiments dynamic allocation of such buffer storage areas is contemplated.

Utilizing such a direct-access or "disk" storage array buffer, I/O operations (e.g., write commands) can effectively be buffered in non-volatile storage in a recoverable manner and status data specifying the completion status of each I/O operation or command can be provided at the occurrence of a synchronizing event even where no sequential access data storage device access has actually been performed. Increased buffer data storage capacity provided by embodiments of the present invention as compared to semiconductor buffers typically provided in sequential-access data storage devices enable enhanced I/O operation performance, data streaming throughput, and storage capacity utilization. Moreover, additional buffering and the consequent enhanced "read-ahead" capability provided enable specific operations (e.g., short-hop locate commands, multiple forward space commands, or the like) to be performed more efficiently. In other embodiments of the present invention, an additional communications port is utilized to separate such specific operations for additional increased bandwidth.

Regarding the storage of I/O operation-related data, in one embodiment certain data or metadata elements (e.g., cyclic redundancy check codes or checksums) are maintained with other I/O operation data stored in a shared data buffer as though the shared data buffer were an extension of the primary target sequential-access storage device buffer in order to validate the integrity of data across the shared buffer. In another embodiment, a secondary communication port within the secondary target direct-access storage device is utilized to re-convey such I/O operation data to a third storage device, generating an additional copy of I/O-related data. Such a shared, direct-access storage device data buffer may also be utilized as a staging area for duplex operations to replicate or re-convey I/O operation requests to multiple target storage devices.

Figure 4:
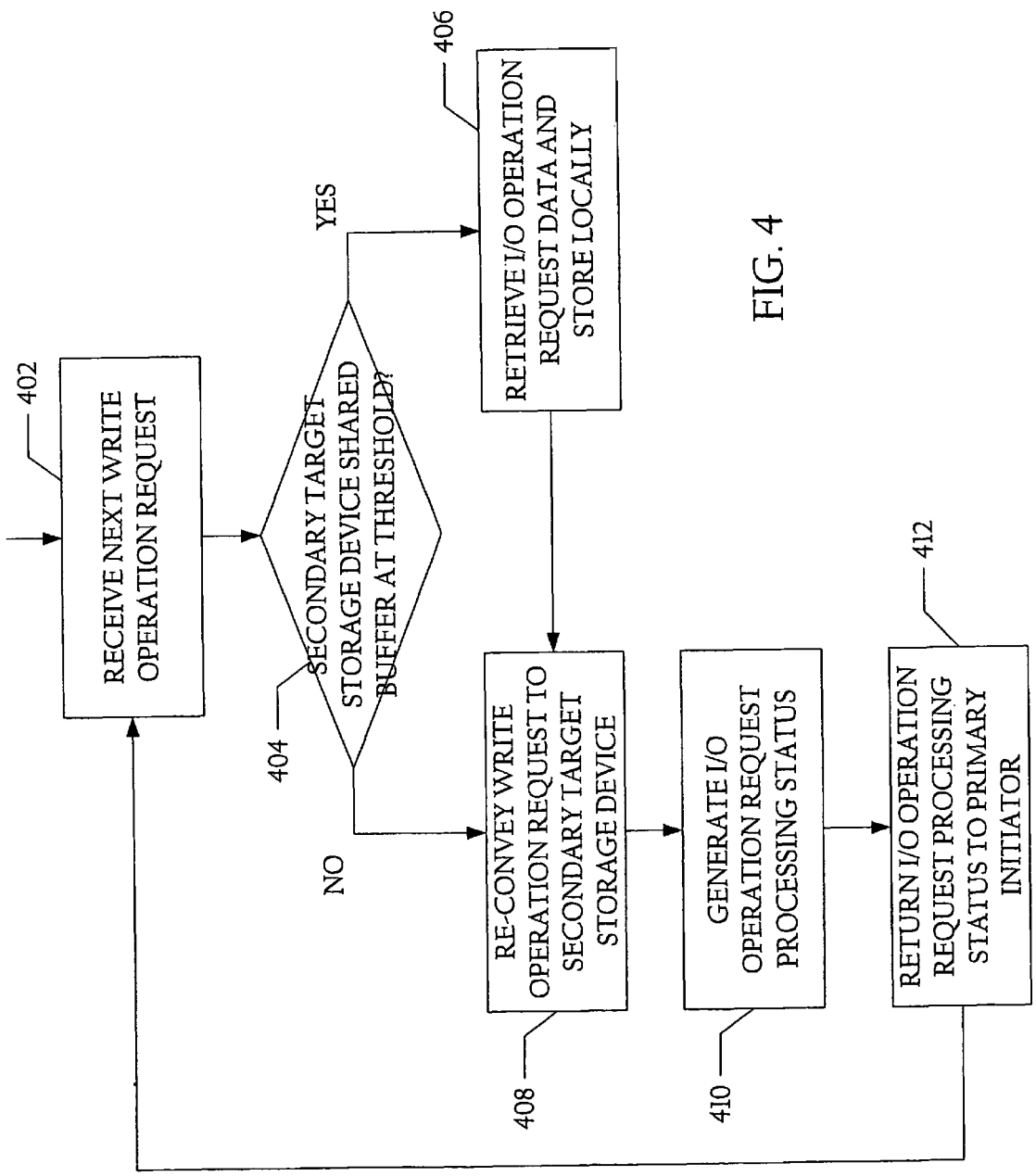
FIG. 4 illustrates a flow diagram of a process to perform a write operation to a sequential-access storage device utilizing a direct-access storage device buffer according to an embodiment of the present invention.

FIG. 4 illustrates a flow diagram of a process to perform a write operation to a sequential-access storage device utilizing a direct-access storage device buffer according to an embodiment of the present invention. In the illustrated process embodiment, a host data processing system primary initiator reserves, mounts, and configures a primary target sequential-access data storage device (not illustrated). As part of the mount operation of the described process, the primary target data storage device accesses the shared buffer, creates an allocated buffer area, and generates a metadata entry associated with the allocated buffer area.

Once the primary target sequential-access data storage device has been properly configured, the host data processing system primary initiator may then begin to issue I/O operation requests or commands (e.g., write operation requests) to the primary target storage device. The primary target receives each write operation request (process block 402) as it is issued and subsequently determines whether the amount of data stored within an associated secondary target data direct-access storage device, utilized to provide shared data buffer functionality, has reached a predefined threshold (process block 404).

If a determination is made that the described buffer data storage threshold has been reached (or exceeded), I/O operation data is read back from the secondary target data storage device (e.g., into a buffer memory of the primary target sequential-access data storage device) and subsequently stored within physical storage media (e.g., tape) of the primary data storage device (process block 406). Thereafter, or if a determination is made that the predetermined buffer data storage threshold has not been reached/exceeded, the received I/O operation request is replicated via a secondary communication port of the primary target to the shared buffer (i.e., the secondary target direct-access data storage device) (process block 408). In alternative embodiments of the present invention, the application of I/O operation requests and associated data to and from the primary and secondary data storage devices may be performed serially or in parallel, time-division multiplexed on a single communication port, and/or performed separately on dedicated ports providing additional bandwidth.

Once the described I/O operations have been re-conveyed as shown, status data specifying the I/O operations' completion status is generated (process block 410). In one embodiment, such status data is generated in response to the receipt of associated data at the primary target data storage device for buffered commands. In another embodiment, such status data is generated/returned when I/O operation request-related data is successfully stored in the shared buffer (e.g., for synchronizing events).

In certain circumstances, (e.g., when a rewind/unload or other re-position command is issued), a portion of the secondary target data storage device's shared buffer containing I/O operation request-related data is written to physical storage media (e.g., tape) of the primary data storage device before the command is indicated as being complete. Where data is transferred at a relatively high rate (e.g., >100 MB/s) as is frequently the case with conventional sequential-access data storage devices, a practical limit is placed on the maximum amount of data which may be buffered at approximately the amount of data that can be written before an unacceptable time delay is imposed on, for example, a media "unload" command. In one embodiment of the present invention, a maximum quantity of data which may be buffered is approximately 10-20 gigabytes, producing an additional delay time period of approximately between 1-2 minutes.

Figure 5:
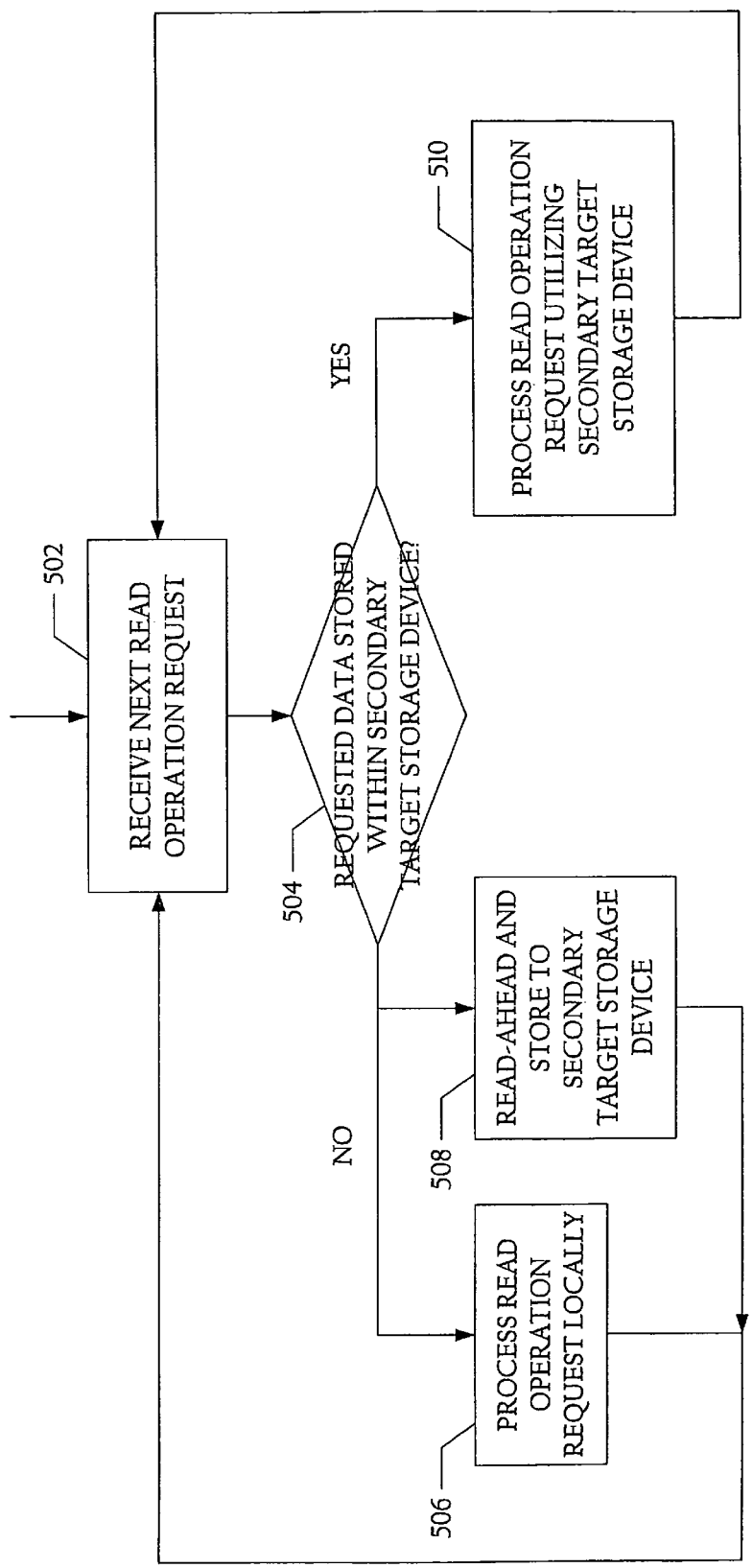
FIG. 5 illustrates a flow diagram of a process to perform a read operation from a sequential-access storage device utilizing a direct-access storage device buffer according to an embodiment of the present invention.

FIG. 5 illustrates a flow diagram of a process to perform a read operation from a sequential-access storage device utilizing a direct-access storage device buffer according to an embodiment of the present invention. In the illustrated process embodiment, a host data processing system primary initiator reserves, mounts, and configures a primary target sequential-access data storage device (not illustrated). As part of the mount operation of the described process, the primary target data storage device accesses a shared buffer provided by a secondary target direct-access data storage device, creates an allocated buffer area, and generates a metadata entry associated with the allocated buffer area.

Once the primary target sequential-access data storage device has been properly configured, the host data processing system primary initiator may then begin to issue I/O operation requests or commands (e.g., read operation requests) to the storage device. The primary target data storage device receives each read operation request (process block 502) as it is issued and subsequently determines whether the requested data is stored within the secondary target direct-access data storage device shared buffer (process block 504). If a determination is made that the requested read operation may not be performed utilizing data of the shared data buffer, the received read operation request is processed locally at the primary target sequential-access data storage device (process block 506). In the illustrated process embodiment, the primary target storage device returns read data directly to the primary initiator rather than via the shared buffer to minimize latency.

As each read operation request is processed and associated data is read and provided to the primary initiator, a "read-ahead" operation is performed where additional data (data beyond that data requested by the current read operation) is read from the storage medium of the primary target data storage device and stored within the secondary data storage device shared buffer (process block 508) utilizing a secondary communication port of the primary target data storage device as an initiator. If a determination is made that the current read operation's requested data is stored or buffered within the secondary data storage device, the requested blocks are read back from the shared buffer utilizing the primary target data storage device's secondary communication port and provided to the primary initiator (process block 510). In one embodiment, such "read ahead" activity is continually performed to load the shared buffer with data associated with a current read block address by spatial locality. Accordingly, both read and write I/O requests may be performed utilizing a shared buffer via the primary target data storage device's secondary port.

Although the operations depicted in FIGS. 3-5 have been described with respect to specific system elements, the actual elements utilized to perform such operations is immaterial to process embodiments of the present invention. Moreover, in alternative embodiments, such operations may be performed by any data storage device or subcomponent thereof. Similarly, while the described flow diagrams indicate a particular order and a specific granularity of process operations, in alternative embodiments the illustrated order may be varied (e.g., process operations may be performed in another order or performed substantially in parallel) and one or more of the process operations may be coalesced or fragmented. Similarly, addition process operations may be added where necessary in alternative embodiments of the present invention.

Embodiments of the present invention may include software, information processing hardware, and various processing operations further described herein. The features and process operations of various invention embodiments may be embodied in executable instructions embodied within a machine-readable medium such as a data processing system memory, a storage device, a communication device or medium, or the like. A machine-readable medium may include any mechanism that provides (i.e., stores) data in a form readable by a machine (e.g., a data processing system).

For example, a machine-readable medium includes but is not limited to: random access memory (RAM); read only memory (ROM); magnetic storage media; optical storage media; flash memory devices; or the like. The described executable instructions can be used to cause a general or special purpose processor, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

While the present invention has been described in the context of fully functional data processing system those skilled in the art will appreciate that the present invention is capable of being distributed as a program product in a variety of forms and applies equally regardless of the particular type of signal bearing media used to carry out the distribution. Examples of such signal bearing media include recordable media such as floppy disks and CD-ROM, transmission type media such as digital and analog communications links, as well as media storage and distribution systems developed in the future. Embodiments of the present invention may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

Although particular embodiments of the present invention have been shown and described, it will be obvious to those skilled in the art that, based upon the teachings herein, changes and modifications may be made without departing from this invention and its broader aspects. Consequently, the appended claims are to encompass within their scope all such changes and modifications as are within the true spirit and scope of this invention and embodiments of the invention are intended to be limited only by the scope of the appended claims, giving full cognizance to equivalents in all respects.

What is claimed is:

1. A method comprising:
   receiving, from a transmitting device via a storage area network (SAN), an input/output ("I/O") operation request at a tape data storage device, comprising a first communication port and a second communication port, wherein said first communication port is coupled to said SAN, said I/O operation request is received at said first communication port, and the I/O operation request including an extension of a Small Computer System Interface (SCSI) reserve command or not including the extension of the SCSI reserve command;
   in response to the I/O operation request including the extension of the SCSI reserve command:
      designating the first communication port as a temporary initiator;
      sending commands from the first communication port to the second communication port;
      reserving and enabling the second communication port, by the tape data storage device;
      processing said I/O operation request utilizing said tape data storage device; and
      re-conveying said I/O operation request to the secondary tape data storage device through said SAN, wherein:
         said re-conveying occurs simultaneously with said processing and via said second communication port of said tape data storage device, and
         said second communication port is coupled to said SAN; and
   in response to the I/O operation request not including the extension of the SCSI reserve command, processing said I/O operation request utilizing said tape data storage device without re-conveying said I/O operation request to the secondary tape data storage device.

2. The method of claim 1, wherein:
said transmitting device is a host data processing system, and
said secondary tape data storage device is reserved for I/O operations utilizing said host data processing system.

3. The method of claim 1, wherein:
said secondary tape data storage device is reserved for I/O operations utilizing said tape data storage device.

4. The method of claim 1, wherein said re-conveying comprises
encoding data associated with said I/O operation request; and
re-conveying said data associated with said I/O operation request in response to said encoding.

5. The method of claim 4, wherein said encoding comprises at least one of compressing said data associated with said I/O operation and encrypting said data associated with said I/O operation.

6. The method of claim 1, wherein said receiving, said processing, and said re-conveying occurs within a storage subsystem.

7. An apparatus comprising:
a tape data storage device comprising a first communication port for receiving input/output (I/O) operation requests and a second communication port for transmitting I/O operation requests;
a secondary tape data storage device in communication with said second communication port; and
at least one processor device, wherein the at least one processor device:
determines that the secondary tape data storage device is "ready" to receive I/O operation requests;
receives an I/O operation request via a storage area network (SAN) at said first communication port of said tape data storage device, wherein said first communication port is coupled to said SAN and said I/O operation request is received at said first communication port and the I/O operation request including an extension of a Small Computer System Interface (SCSI) reserve command or not including the extension of the SCSI reserve command; wherein, in response to the I/O operation request including the extension of the SCSI reserve command, the at least one processor device performs:
designating the first communication port as a temporary initiator;
sending commands from the first communication port to the second communication port;
reserving and enabling the second communication port, by the tape data storage device;
processing said I/O operation request utilizing said tape data storage device; and
simultaneously re-conveying said I/O operation request to said secondary tape data storage device through said SAN via said second communication port of said tape data storage device, wherein said second communication port is coupled to said SAN; and
in response to the I/O operation request not including the extension of the SCSI reserve command, processing said I/O operation request utilizing said tape data storage device without re-conveying said I/O operation request to the secondary tape data storage device.

8. The apparatus of claim 7, wherein the at least one processor device:
receives said I/O operation request from a transmitting device comprising a host data processing system, and
said secondary tape data storage device is reserved for I/O operations utilizing said host data processing system.

9. The apparatus of claim 7, wherein:
said secondary tape data storage device is reserved for I/O operations utilizing said tape data storage device.

10. The apparatus of claim 7, wherein processing and re-conveying comprises:
encoding data associated with said I/O operation request; and
re-conveying said data associated with said I/O operation request in response to an encoding of said data associated with said I/O operation request.

11. The apparatus of claim 10, wherein encoding comprises at least one of compressing said data associated with said I/O operation and means for encrypting said data associated with said I/O operation.

12. The apparatus of claim 7, wherein said at least one processor device performing the receiving, processing, and simultaneously re-conveying, said SAN, said tape data storage device, and said secondary tape data storage device form at least a portion of a storage subsystem.

13. A non-transitory machine-readable memory comprising a plurality of instructions executable by a machine embodied therein, which when executed cause said machine to perform a method comprising:
receiving, from a transmitting device via a storage area network (SAN), an input/output ("I/O") operation request at a tape data storage device, comprising a first communication port and a second communication port, wherein said first communication port is coupled to said SAN, said I/O operation request is received at said first communication port, and the I/O operation request including an extension of a Small Computer System Interface (SCSI) reserve command or not including the extension of the SCSI reserve command;
in response to the I/O operation request including the extension of the SCSI reserve command:
designating the first communication port as a temporary initiator;
sending commands from the first communication port to the second communication port;
reserving and enabling the second communication port, by the tape data storage device;
processing said I/O operation request utilizing said tape data storage device; and
re-conveying said I/O operation request to the secondary tape data storage device through said SAN, wherein:
said re-conveying occurs simultaneously with said processing and via said second communication port of said tape data storage device, and
said second communication port is coupled to said SAN; and
in response to the I/O operation request not including the extension of the SCSI reserve command, processing said I/O operation request utilizing said tape data storage device without re-conveying said I/O operation request to the secondary tape data storage device.

14. The non-transitory machine-readable memory of claim 13, wherein:
said receiving comprises receiving said I/O operation request from said transmitting device, said transmitting device comprising a host data operating system, and
said secondary tape data storage device is reserved for I/O operations utilizing said host data processing system.

15. The non-transitory machine-readable memory of claim 13, wherein:
said secondary tape data storage device is reserved for I/O operations utilizing said first tape data storage device.

16. The non-transitory machine-readable memory of claim 13, wherein said receiving, said processing, and said re-conveying occurs within a storage subsystem.

\* \* \* \* \*